United States Patent
Tsai et al.

(10) Patent No.: US 11,694,544 B2
(45) Date of Patent: Jul. 4, 2023

(54) TRAFFIC SAFETY CONTROL METHOD AND VEHICLE-MOUNTED DEVICE

(71) Applicant: Mobile Drive Technology Co., Ltd., New Taipei (TW)

(72) Inventors: Hsien-Chi Tsai, New Taipei (TW); Chun-Yu Chen, New Taipei (TW)

(73) Assignee: Mobile Drive Netherlands B.V., Amsterdam (NL)

(*) Notice: Subject to any disclaimer, the term of this patent is extended or adjusted under 35 U.S.C. 154(b) by 266 days.

(21) Appl. No.: 16/889,274

(22) Filed: Jun. 1, 2020

(65) Prior Publication Data
US 2021/0295683 A1    Sep. 23, 2021

(30) Foreign Application Priority Data
Mar. 19, 2020    (CN) .......................... 202010198308.7

(51) Int. Cl.
*G08G 1/00*    (2006.01)
*G08G 1/01*    (2006.01)
*G08G 1/0962*    (2006.01)
*G08G 1/04*    (2006.01)

(52) U.S. Cl.
CPC ......... *G08G 1/0145* (2013.01); *G08G 1/0133* (2013.01); *G08G 1/04* (2013.01); *G08G 1/09626* (2013.01)

(58) Field of Classification Search
CPC ...... G08G 1/0145; G08G 1/0133; G08G 1/04; G08G 1/09626
See application file for complete search history.

(56) References Cited

U.S. PATENT DOCUMENTS

| 6,018,697 A | * | 1/2000 | Morimoto | G08G 1/096872 701/428 |
| 2005/0149262 A1 | * | 7/2005 | Oikubo | G01C 21/3658 340/995.19 |
| 2007/0106470 A1 | * | 5/2007 | Nakayama | G01C 21/3658 701/437 |
| 2010/0049428 A1 | * | 2/2010 | Murata | G09B 29/007 701/533 |
| 2019/0049964 A1 | * | 2/2019 | Jang | G06V 10/75 |

FOREIGN PATENT DOCUMENTS

| CN | 106355914 | 1/2017 |
| CN | 106945669 | 7/2017 |
| CN | 105448094 | 12/2017 |
| CN | 110843773 | 2/2020 |

* cited by examiner

Primary Examiner — Truc M Do
(74) Attorney, Agent, or Firm — ScienBizip, P.C.

(57) ABSTRACT

A traffic safety control method is provided. The method includes determining whether there is an intersection in front of a vehicle. When there is the intersection in front of the vehicle, a driving direction of the vehicle at the intersection is predicted according to a plurality of lane positions of the vehicle that are continuously obtained. A message is transmitted once the predicted driving direction is determined to be conflicting with a traffic rule of the intersection.

12 Claims, 5 Drawing Sheets

TRAFFIC SAFETY CONTROL METHOD AND VEHICLE-MOUNTED DEVICE

FIELD

The present disclosure relates to traffic safety control technology, in particular to a traffic safety control method, and a vehicle-mounted device.

BACKGROUND

To avoid conflict with traffic rules of intersections, a driver can use and follow a driving route generated based on a navigation system. However, if the navigation system is turned off, the driver must manually observe traffic signs and manually determine whether the road ahead is accessible based on the traffic signs. This method obviously requires the driver's attention and brings great hidden danger.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
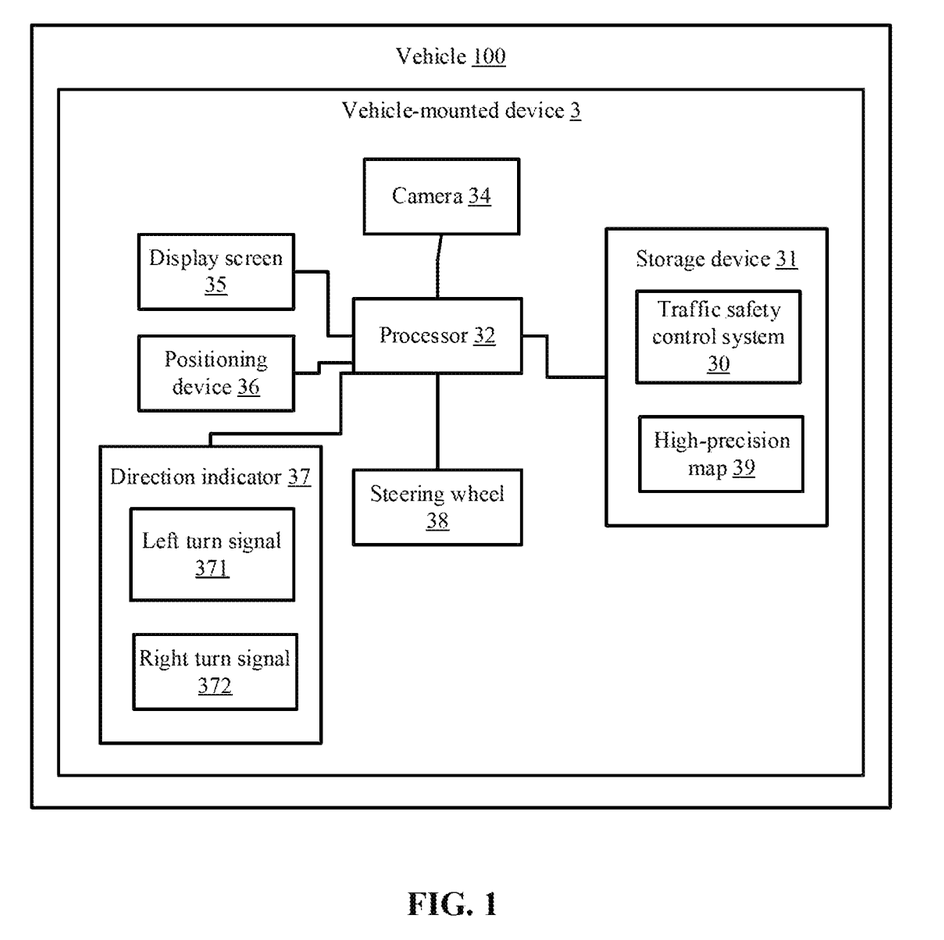
FIG. 1 illustrates a schematic diagram of a vehicle-mounted device of the present disclosure.

FIG. 1 illustrates a schematic diagram of a vehicle-mounted device of the present disclosure.

In at least one embodiment, the vehicle-mounted device 3 is installed on a vehicle 100. The vehicle-mounted device 3 is essentially a vehicle-mounted computer. The vehicle-mounted device 3 includes a storage device 31, at least one processor 32, a camera 34, a display screen 35, a positioning device 36, a direction indicator 37, and a steering wheel 38. The above components are electrically connected to each other.

Those skilled in the art should understand that the structure of the vehicle-mounted device 3 shown in FIG. 1 does not constitute a limitation of the embodiment of the present disclosure. The vehicle-mounted device 3 can further include more or less other hardware or software than that shown in FIG. 1, or the vehicle-mounted device 3 can have different component arrangements.

It should be noted that the vehicle-mounted device 3 is merely an example. If another kind of vehicle-mounted devices can be adapted to the present disclosure, it should also be included in the protection scope of the present disclosure, and incorporated herein by reference In some embodiments, the storage device 31 may be used to store program codes and various data of computer programs. For example, the storage device 31 may be used to store a traffic safety control system 30 and a high-precision map 39 installed in the vehicle-mounted device 3, and implement high-speed and automatic completion of storing programs or data during operation of the vehicle-mounted device 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit, or can be composed of multiple packaged integrated circuits with same function or different function. The at least one processor 32 includes one or more central processing units (CPUs), one or more microprocessors, one or more digital processing chips, one or more graphics processors, and various control chips. The at least one processor 32 is a control unit of the vehicle-mounted device 3. The at least one processor 32 uses various interfaces and lines to connect various components of the vehicle-mounted device 3, and executes programs or modules or instructions stored in the storage device 31, and invokes data stored in the storage device 31 to perform various functions of the vehicle-mounted device 3 and to process data, for example, perform a function of controlling traffic safety of the vehicle 100 (for details, see the description of FIG. 3). In this embodiment, the camera 34 can be installed at a position where a front windshield of the vehicle 100 is located. The camera 34 can capture images of a scene in front of the vehicle 100.

The display screen 35 may be a touch display screen for displaying various data of the vehicle-mounted device 3, such as displaying a user interface of a high-precision map 39. In this embodiment, the high-precision map 39 may be a map such as BAIDU high-precision map or other maps such as a GOOGLE high-precision map.

In this embodiment, the high-precision map 39 indicates all roads, all lane positions and intersections included in each of the roads, a traffic rule corresponding to each of the intersections, and the like.

In one embodiment, the traffic rule corresponding to each intersection includes restrictions on turning of vehicles on each road at each intersection. In other embodiments, the traffic rule corresponding to each intersection further includes restrictions on vehicle types (such as large cars, small cars), weights, heights, lengths, and the like, of vehicles on each road at each intersection.

In this embodiment, the positioning device 36 can be used to locate a current position (such as longitude and latitude information) of the vehicle 100. In one embodiment, the positioning device 36 can be a Global Positioning System (GPS), an Assisted Global Positioning System (AGPS), a BeiDou Navigation Satellite System (BDS), a global navigation satellite system (GLONASS), or a combination thereof.

The direction indicator 37 warns other vehicles and pedestrians to pay attention to the vehicle 100 when the direction indicator 37 is turned on. In detail, when the direction indicator 37 is turned on, the direction indicator 37 flashes to indicate that the vehicle 100 is turning left or right. The direction indicator 37 includes a left turn signal 371 and a right turn signal 372. When the left turn signal 371 is turned on, the left turn signal 371 flashes to indicate that the vehicle 100 is turning left. When the right turn signal 372 is turned on, the right turn signal 372 flashes to indicate that the vehicle 100 is turning right.

In this embodiment, the traffic safety control system 30 can include one or more modules. The one or more modules are stored in the storage device 31, and are executed by at least one processor (e.g. processor 32 in this embodiment), such that a function of controlling traffic safety (for details, see the introduction to FIG. 3 below) is achieved.

Figure 2:
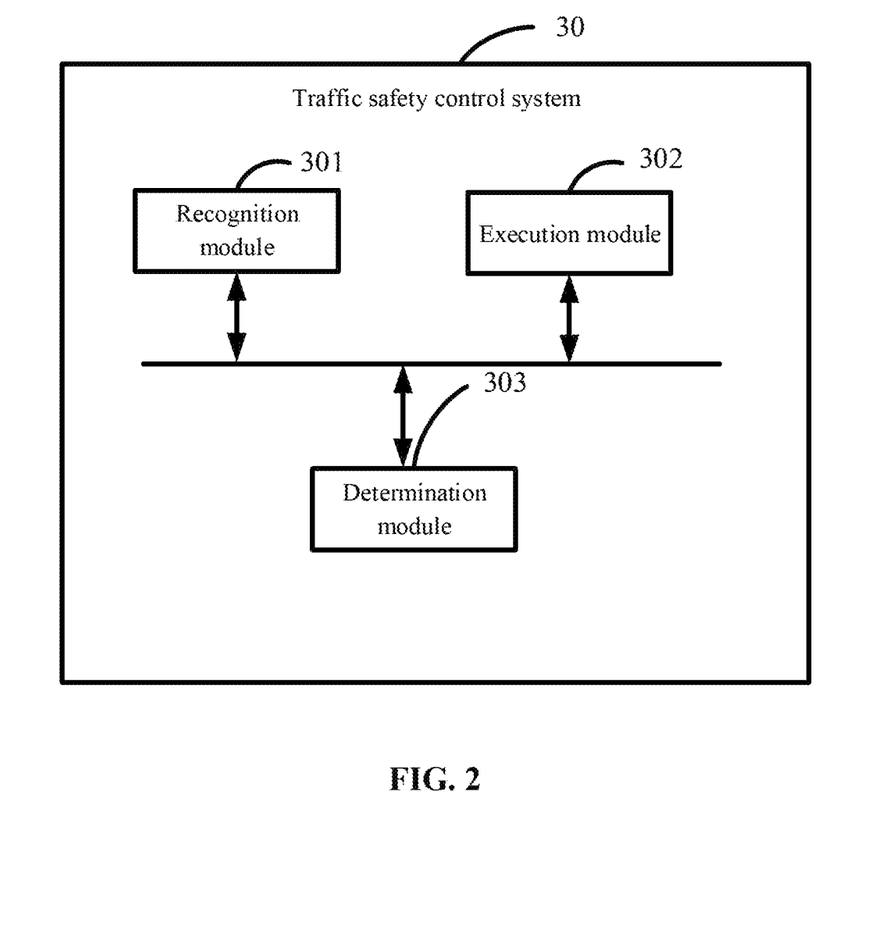
FIG. 2 shows one embodiment of modules of a traffic safety control system of the present disclosure.

In this embodiment, the traffic safety control system 30 can include a plurality of modules. Referring to FIG. 2, the plurality of modules includes a recognition module 301, an execution module 302, and a determination module 303. The module referred to in the present disclosure refers to a series of computer-readable instructions that can be executed by at least one processor (for example, the processor 32), and can complete fixed functions, and can be stored in a storage device (for example, the storage device 31 of the vehicle-mounted device 3). In this embodiment, the functions of each module will be described in detail with reference to FIG. 3.

Figure 3:
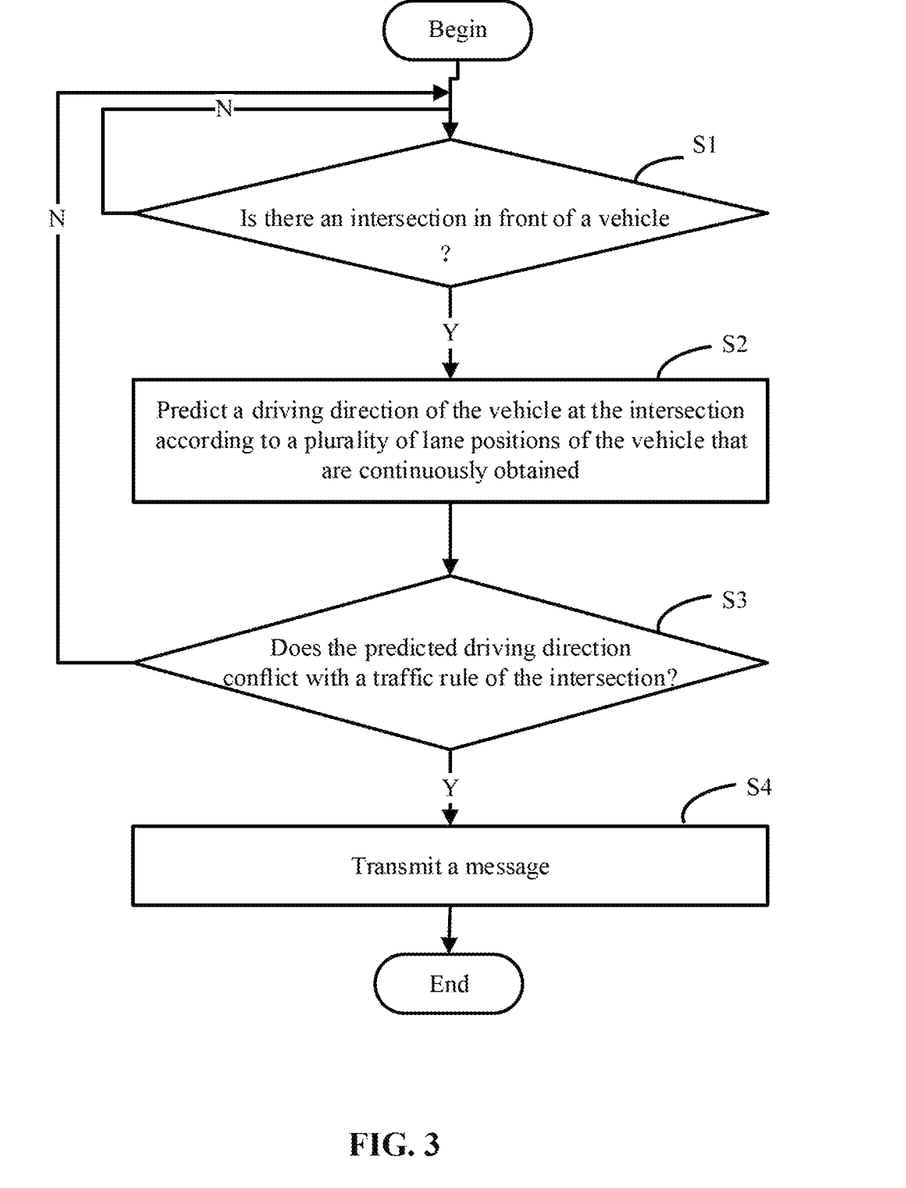
FIG. 3 shows a flow chart of one embodiment of a traffic safety control method of the present disclosure.

In this embodiment, an integrated unit implemented in a form of a software functional module can be stored in a non-transitory readable storage medium. The above modules include one or more computer-readable instructions. The vehicle-mounted device 3 or a processor implements the one or more computer-readable instructions, such that the method for controlling traffic safety shown in FIG. 3 is achieved.

In a further embodiment, referring to FIG. 2, the at least one processor 32 can execute an operating system of the vehicle-mounted device 3, various types of applications (such as the traffic safety control system 30 described above), program codes, and the like.

In a further embodiment, the storage device 31 stores program codes of a computer program, and the at least one processor 32 can invoke the program codes stored in the storage device 31 to achieve related functions. For example, each module of the traffic safety control system 30 shown in FIG. 2 is a program code stored in the storage device 31. Each module of the traffic safety control system 30 shown in FIG. 2 is executed by the at least one processor 32, such that the functions of the modules are achieved, and a purpose of controlling the traffic safety (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of controlling traffic safety. Specifically, the computer-readable instructions executed by the at least one processor 32 to achieve the purpose of controlling traffic safety are described in detail in FIG. 3 below.

FIG. 3 is a flowchart of a traffic safety control method according to a preferred embodiment of the present disclosure.

In this embodiment, the traffic safety control method can be applied to the vehicle-mounted device 3. For the requirement to control traffic safety of a vehicle, the vehicle-mounted device 3 can be directly integrated with the function of controlling the traffic safety. The vehicle-mounted device 3 can also achieve the function of controlling the traffic safety by running a Software Development Kit (SDK).

FIG. 3 shows a flow chart of one embodiment of a traffic safety control method. Referring to FIG. 3, the method is provided by way of example, as there are a variety of ways to carry out the method. The method described below can be carried out using the configurations illustrated in FIG. 1, for example, and various elements of these figures are referenced in the explanation of the method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, when the vehicle 100 is traveling on a road, the recognition module 301 determines whether there is an intersection in front of the vehicle 100. When there is the intersection in front of the vehicle 100, the process goes to block S2.

In an embodiment, the front of the vehicle 100 can be defined to be a range that is within a preset distance (e.g., within 150 m or 200 m) ahead of the vehicle 100 on the road.

In a first embodiment, the recognition module 301 can use the positioning device 36 and the high-precision map 39 to determine whether there is the intersection in front of the vehicle 100.

Specifically, the determining of whether there is the intersection in front of the vehicle 100 includes: obtaining position information (e.g., position coordinates) of the vehicle 100 using the positioning device 36; locating a position of the vehicle 100 on the high-precision map 39 based on the position information of the vehicle 100; and obtaining map information in front of the vehicle 100 from the high-precision map 39. The map information indicates whether there is the intersection in front of the vehicle 100. Thus the recognition module 301 can determine whether there is the intersection in front of the vehicle 100 according to the map information.

In a second embodiment, the determining of whether there is the intersection in front of the vehicle 100 includes: capturing an image using the camera 34; identifying whether the captured image includes an image of a traffic light using an image recognition algorithm; and determining there is the intersection in front of the vehicle 100 when the captured image includes the traffic light; or determining there is no intersection in front of the vehicle 100 when the captured image does not include the traffic light.

In this embodiment, the image recognition algorithm includes a template matching method. The recognition module 301 can preset images of various types of traffic lights as templates. Therefore, the recognition module 301 can use the template matching method to identify whether the captured image includes the image of a traffic light.

At block S2, when there is the intersection in front of the vehicle 100, the execution module 302 predicts a driving direction of the vehicle 100 at the intersection according to a plurality of lane positions of the vehicle 100 that are continuously obtained.

In a first embodiment, the prediction of the driving direction of the vehicle 100 at the intersection based on the plurality of lane positions includes (a1)-(a2).

(a1) Starting when the vehicle 100 is at a first preset distance (for example, 200 m, 150 m, or other distance) from the intersection, the execution module 302 identifies a lane position of the vehicle 100 each time when the vehicle 100 travels for a second preset distance (for example, 50 m, 20 m, or other distance), until the vehicle 100 is at a distance from the intersection less than the second preset distance, such that the plurality of lane positions are obtained. That is, the lane position of the vehicle 100 when the vehicle 100 is at a distance from the intersection less than the second preset distance is not used to predict the driving direction of the vehicle 100 at the intersection. In the embodiment, when the vehicle 100 is at the distance from the intersection less than the second preset distance, the execution module 302 does not identify the lane position of the vehicle 100.

Specifically, the execution module 302 can obtain the distance of the vehicle 100 from the intersection from the high-precision map 39 in real time, and can identify the lane position of the vehicle 100 from the high-precision map 39.

In this embodiment, the lane position may be an innermost lane, an outermost lane, and a middle lane.

In this embodiment, the lane position is defined based on a traffic direction prescribed by the traffic rule. The traffic direction may be a direction of left-hand driving or a direction of right-hand driving. Specifically, from left to right, lane positions of a road can also be successively named as a first lane, a second lane, a third lane, and so on. Therefore, the first lane is the innermost lane, the lane that is corresponding to the innermost lane is the outermost lane, and the lane between the innermost lane and the outermost lane is the middle lane.

(a2) The execution module 302 predicts the driving direction of the vehicle 100 at the intersection based on a driving path indicated by the plurality of lane positions.

Specifically, when the driving path formed by the plurality of lane positions is offset to the left, the execution module 302 predicts that the vehicle 100 is going to make a left turn at the intersection. When the driving path formed by the plurality of lane positions is offset to the right, the execution module 302 predicts that the vehicle 100 is going to make a right turn at the intersection. When the driving path formed by the plurality of lane positions is not offset to the left or right, the execution module 302 predicts that the vehicle 100 is going to go straight on at the intersection.

Figure 4:
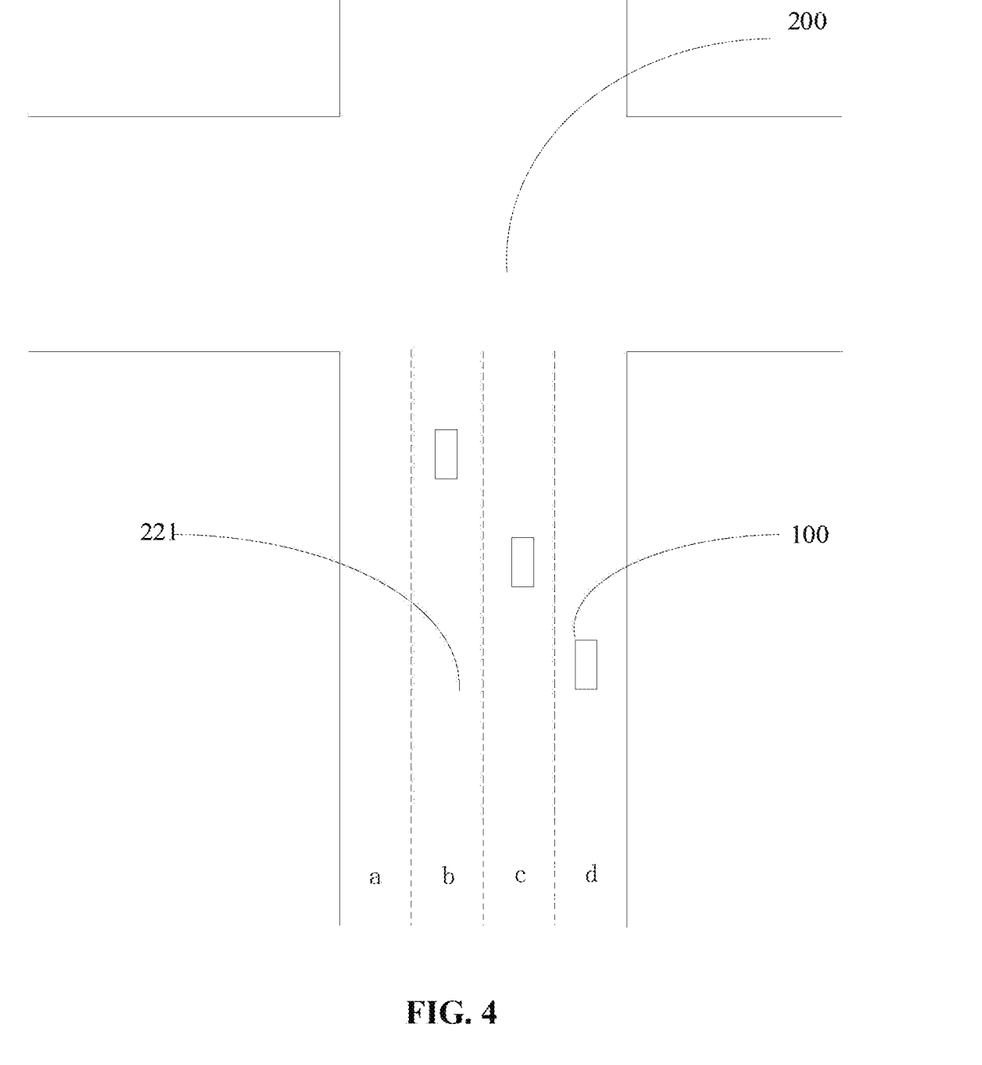
FIG. 4 illustrates an example of lane positions of a vehicle.

For example, referring to FIG. 4, it is assumed that the vehicle 100 is traveling on a road 221, and beginning from the vehicle 100 is at 200 m from the intersection 200, the execution module 302 identifies the lane position of the vehicle 100 at every 50 m. The execution module 302 identifies that the lane position of the vehicle 100 is the fourth lane d when the vehicle 100 arrives at a position that is 150 m from the intersection 200, the fourth lane d is the outermost lane. The execution module 302 identifies that the lane position of the vehicle 100 is the third lane c when the vehicle 100 arrives at a position that is 100 m from the intersection 200, the third lane c is a middle lane. The execution module 302 identifies that the lane position of the vehicle 100 is the second lane b when the vehicle 100 arrives at a position that is 50 m from the intersection 200, the second lane b is a middle lane. Thus, the execution module 302 obtains the driving path d-c-b of the vehicle 100 which is offset to left, such that the execution module 302 can predict that the driving direction of the vehicle 100 at the intersection is to turn left.

It should be noted that, in other embodiments, the execution module 302 can collect a preset number (e.g., 100,000 copies) of sample data (each sample data includes a driving path corresponding to the intersection). The execution module 302 can obtain a prediction model by training a neural network using the preset number of sample data. Such that when the driving path of the vehicle 100 is obtained, the execution module 302 can input the driving path of the vehicle 100 into the prediction model, therefore, the driving direction of the vehicle 100 at the intersection can be obtained.

In one embodiment, when the driving direction of the vehicle 100 at the intersection is predicted, the execution module 302 further obtains an indication signal of the direction indicator 37 when the distance of the vehicle 100 from the intersection is less than the second preset distance. When the predicted driving direction is a left turn, the execution module 302 determines whether or not the left turn signal 371 of the vehicle 100 is turned on according to the obtained indication signal. When the left turn signal 371 of the vehicle 100 is not turned on, the execution module 302 transmits a warning (for example, the execution module 302 warns a driver of vehicle 100 to turn on the left turn signal). When the predicted driving direction is a right turn, the execution module 302 determines whether or not the right turn signal 372 of the vehicle 100 is turned on according to the obtained indication signal. When the right turn signal 372 of the vehicle 100 is not turned on, the execution module 302 transmits the warning (for example, the execution module 302 warns the driver of vehicle 100 to turn on the right turn signal 372).

In one embodiment, the execution module 302 can transmit the warning by playing a preset audio file using an audio device of the vehicle-mounted device 3 or using an audio device that is wirelessly connected with the vehicle-mounted device 3.

In one embodiment, when the driving direction of the vehicle 100 at the intersection is predicted, the execution module 302 obtains the lane position of the vehicle 100 when the distance of the vehicle 100 from the intersection is less than the second preset distance (to clearly illustrate the present disclosure, the lane position of the vehicle 100 obtained when the distance of the vehicle 100 from the intersection is less than the second preset distance is referred to as "latest lane position"). When the predicted driving direction is the left turn, and the latest lane position is the middle lane or the outermost lane, the execution module 302 transmits a warning (for example, the execution module 302 prompts the driver of the vehicle 100 to drive into the innermost lane as soon as possible, the execution module 302 can make the prompt in a voice manner). When the predicted driving direction is a right turn, and the latest lane position is the middle lane or the innermost lane, the execution module 302 transmits the warning (for example, the execution module 302 prompts the driver of the vehicle 100 to drive into the outermost lane as soon as possible, the execution module 302 can make the prompt vocally).

In other embodiments, (a12) is further included between (a1) and (a2):

(a12) When the distance of vehicle 100 from the intersection is less than the second preset distance, the execution module 302 can obtain a turning signal of the vehicle 100. The execution module 302 can predict the driving direction of the vehicle 100 at the intersection according to the driving path formed by the plurality of lane positions and the turning signal of the vehicle 100.

In this embodiment, the turning signal can be a can (controller area network) signal. The turning signal can be the indication signal of the direction indicator 37 or a signal taken from a steering wheel 38 of the vehicle 100.

In this embodiment, the execution module 302 can obtain the can signal from a can bus that is used to connect the direction indicator 37 and the steering wheel 38.

Still as described above, it is assumed that the obtained driving path of the vehicle 100 is d-c-b. The obtained driving path d-c-b is offset to left. When the distance of vehicle 100 from the intersection is less than 50 meters, the turning signal obtained by the execution module 302 is a left turn signal, the execution module 302 can predict that the driving direction of the vehicle 100 is a left turn. As another example, it is assumed that the obtained driving path of the vehicle 100 is c-b-c. The obtained driving path c-b-c is not offset to left or right. When the distance of the vehicle 100 from the intersection is less than 50 m, the indication signal of the direction indicator 37 cannot be obtained by the execution module 302, or the signal taken from the steering wheel 38 obtained by the execution module 302 indicates that the vehicle 100 is driving straight, the execution module 302 can predict that the vehicle 100 is going to drive straight on at the intersection.

Similarly, in other embodiments, the execution module 302 can collect a preset number (e.g., 100,000 copies) of sample data (each sample data includes a driving path corresponding to the intersection and a turning signal corresponding to a driving path). The execution module 302 can obtain a prediction model by training a neural network using the preset number of sample data. Such that the execution module 302 can input the driving path and the turning signal of the vehicle 100 in the prediction model, and obtain the driving direction of the vehicle 100 at the intersection.

In a second embodiment, the prediction of the driving direction of the vehicle at the intersection based on the plurality of lane positions includes (b1)-(b5).

(b1) The execution module 302 identifies whether the current lane position of the vehicle 100 is the innermost lane, the outermost lane, or the middle lane. The current lane position of the vehicle 100 can be defined to be a lane position where the vehicle 100 is currently located.

In one embodiment, the execution module 302 can identify whether the current lane position is the innermost lane, the outermost lane, or the middle lane from the high-precision map 39.

(b2) When the current lane position of the vehicle 100 is the innermost lane or the outermost lane, the execution module 302 obtains the turning signal of the vehicle 100, and predicts the driving direction of the vehicle 100 at the intersection according to the turning signal of the vehicle 100.

In this embodiment, when the current lane position of the vehicle 100 is the innermost lane and the turning signal is the left turn signal, the execution module 302 predicts that the driving direction of the vehicle 100 at the intersection is the left turn. When the current lane position of the vehicle 100 is the outermost lane and the turning signal is the right turn signal, the execution module 302 predicts that the driving direction of the vehicle 100 at the intersection is the right turn.

In this embodiment, when the current lane position of the vehicle 100 is the innermost lane and the turning signal is the right turn signal or the turning signal cannot be obtained, the execution module 302 determines that the driving direction of the vehicle 100 at the intersection is non-predictable. When the current lane position of the vehicle 100 is the outermost lane, and the turning signal is the left turn signal or the turning signal cannot be obtained, the execution module 302 determines that the driving direction of the vehicle 100 at the intersection is non-predictable. (b3) When the current lane position of the vehicle 100 is the innermost lane or the outermost lane, but the driving direction of the vehicle 100 at the intersection cannot be predicted based on the turning signal, the execution module 302 determines whether or not the vehicle 100 reached the intersection by comparing a current distance of the vehicle 100 from the intersection with a third preset distance. When the current lane position of the vehicle 100 is the middle lane, the execution module 302 determines whether or not the vehicle 100 reached the intersection by comparing the current distance of the vehicle 100 from the intersection with the third preset distance.

When the vehicle 100 has reached the intersection, the process goes to (b4). When the vehicle 100 has not reached the intersection, the process goes to (b5).

Specifically, when a distance of the vehicle 100 from the intersection is less than the third preset distance (for example, 20 m, or 50 m), the execution module 302 determines that the vehicle 100 has reached the intersection. When the distance of the vehicle 100 from the intersection is greater than or equal to the third preset distance, the execution module 302 determines that the vehicle 100 has not yet reached the intersection.

(b4) the execution module 302 predicts the driving direction of the vehicle 100 according to the current lane position of the vehicle 100 when the vehicle 100 has reached the intersection.

Specifically, when the current lane position of the vehicle 100 is the innermost lane, the execution module 302 predicts that the driving direction of the vehicle 100 is the left turn. When the current lane position of the vehicle 100 is the outermost lane, the execution module 302 predicts that the driving direction of the vehicle 100 is the right turn. When the current lane position of the vehicle 100 is the middle lane, the execution module 302 predicts that the driving direction of the vehicle 100 is to go straight on.

(b5) When the vehicle 100 has not yet reached the intersection, the execution module 302 identifies the lane position of the vehicle 100 each time when the vehicle 100 has traveled for a fourth preset distance (e.g., 10 m, or 20 m), until the distance of the vehicle 100 from the intersection is less than the fourth preset distance, thereby a plurality of lane positions of the vehicle 100 are obtained. The execution module 302 predicts the driving direction of the vehicle 100 at the intersection based on a driving path formed by the plurality of lane positions of the vehicle 100.

It should be noted that, in (b5), the method for predicting the driving direction of the vehicle 100 at the intersection based on the driving path formed by the plurality of lane positions of the vehicle 100 can be the same as described in the above (a2). Accordingly, the method for predicting the driving direction of the vehicle 100 at the intersection is not repeated here.

In other embodiments, (b5) can further include: when the distance of the vehicle 100 from the intersection is less than the fourth preset distance, the execution module 302 obtains the turning signal of the vehicle 100, and predicts the driving direction of the vehicle 100 at the intersection according to the driving path formed by the plurality of lane positions of the vehicles 100 and the turning signal of the vehicle 100.

It should be noted that, here the method of predicting the driving direction of the vehicle 100 at the intersection based on the driving path formed by a plurality of lane positions of the vehicle 100 and the turning signal of the vehicle 100 can be the same as described in the above (a12). Accordingly, the method of predicting the driving direction of the vehicle 100 at the intersection based on the driving path formed by a plurality of lane positions of the vehicle 100 and the turning signal of the vehicle 100 is not repeated.

At block S3, the determination module 303 determines whether the predicted driving direction conflicts with the traffic rule of the intersection. When the predicted driving direction conflicts with the traffic rule of the intersection, the process goes to block S4. When the predicted driving direction does not conflict with the traffic rule of the intersection, the process returns to block S1.

As mentioned above, the traffic rule indicates restrictions on the turning of vehicles on each road at the intersection.

Figure 5:
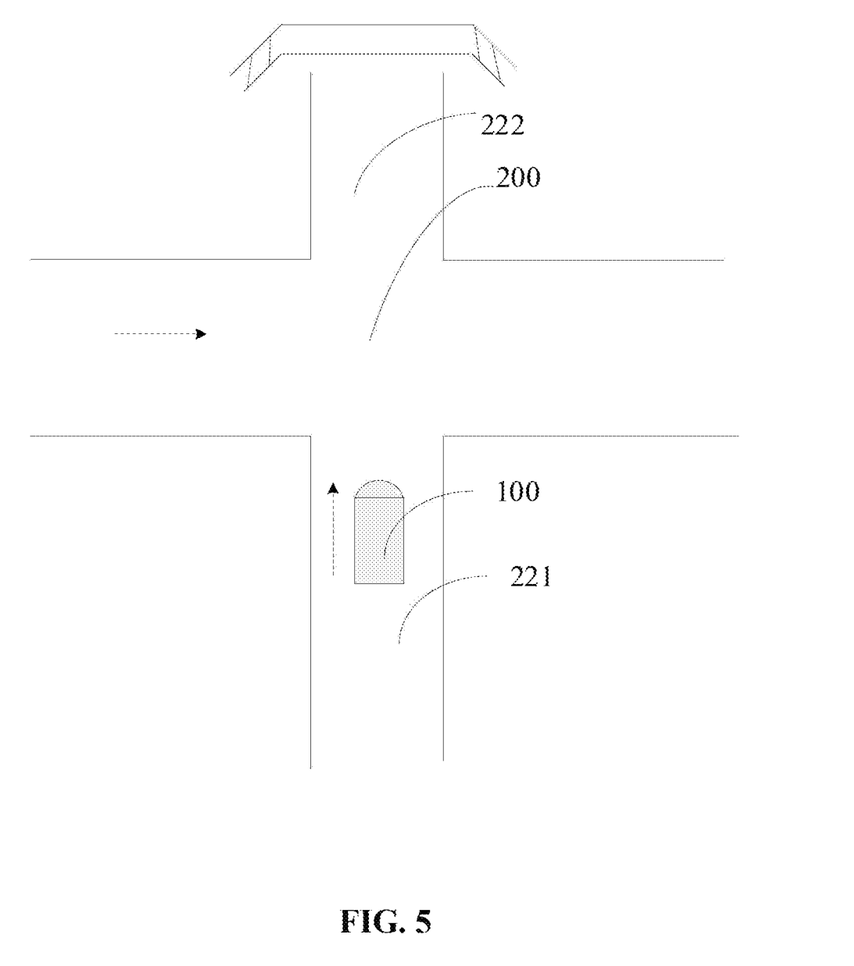
FIG. 5 illustrates an example of a predicted driving direction of a vehicle in conflict with a traffic rule of an intersection.

For example, referring to FIG. 5, the vehicle 100 is driving on the road 221. Suppose that the predicted driving direction of the vehicle 100 at the intersection 200 is the left turn, and the traffic rule of the intersection 200 forbids the vehicle on the road 221 to make the left turn. Then the predicted driving direction of the vehicle 100 conflicts with the traffic rule of the intersection 200.

In other embodiments, the traffic rule further indicates prohibitions on the vehicle type (such as a large car, a small car), the weight, the height, the length, and the like of the vehicle on each road of the intersection. Thus, the execution module 302 can determine whether the predicted driving direction conflicts with the traffic rule of the intersection according to the predicted driving direction, the traffic rule of the intersection, and the vehicle parameters (such as the vehicle type, weight, height, length, etc.) of the vehicle 100.

For example, referring to FIG. 5, the vehicle 100 is driving on the road 221. Assuming that the predicted driving direction of the vehicle 100 at the intersection 200 is to go straight on, the traffic rule of the intersection 200 indicates that the height of the vehicle passing the road 222 should be less than 3.5 meters. If the height of the vehicle 100 is higher than 3.5 meters, then the execution module 302 can determine that the predicted driving direction of the vehicle 100 conflicts with the traffic rule of the intersection 200.

In this embodiment, the determination module 303 can obtain the traffic rule of the intersection from the high-precision map 39.

At block S4, when the predicted driving direction conflicts with the traffic rule of the intersection, the execution module 302 transmits a message in a preset manner.

In one embodiment, the preset manner can include: displaying text information on the display screen 35, and using the text information to warn the driver of the vehicle 100 that the predicted driving direction conflicts with the traffic rule of the intersection.

In other embodiments, the preset manner can further include: warning the driver of the vehicle 100 that the predicted driving direction conflicts with the traffic rule of the intersection by playing a preset audio file.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A traffic safety control method applied to a vehicle-mounted device, the method comprising:

determining whether there is an intersection in front of a vehicle, comprising: capturing an image using a camera that is installed on the vehicle; identifying whether the captured image comprises an image of a traffic light using an image recognition algorithm; and determining there is the intersection in front of the vehicle when the captured image comprises the traffic light;

predicting a driving direction of the vehicle at the intersection according to a driving path formed by a plurality of lane positions of the vehicle that are continuously obtained when there is the intersection in front of the vehicle, wherein the plurality of lane positions is obtained by: beginning from the vehicle being at a first preset distance from the intersection, identifying a lane position of the vehicle each time when the vehicle travels for a second preset distance, until the vehicle is at a distance from the intersection less than the second preset distance; and transmitting a message when the predicted driving direction is in conflict with a traffic rule of the intersection.

2. The traffic safety control method according to claim 1, further comprising:

predicting that the vehicle is going to make a left turn at the intersection, in response that the driving path formed by the plurality of lane positions is offset to a left;

predicting that the vehicle is going to make a right turn at the intersection, in response that the driving path formed by the plurality of lane positions is offset to a right; and predicting that the vehicle is going to go straight on at the intersection, in response that the driving path formed by the plurality of lane positions is not offset to the left and right.

3. The traffic safety control method according to claim 1, wherein the method further comprises:

obtaining an indication signal of a direction indicator of the vehicle when the distance of the vehicle from the intersection is less than the second preset distance;

determining whether or not a left turn signal of the vehicle is turned on according to the indication signal when the predicted driving direction is the left turn; and transmitting a warning when the left turn signal of the vehicle is not turned on; and determining whether or not a right turn signal of the vehicle is turned on according to the indication signal when the predicted driving direction is the right turn; and transmitting the warning when the right turn signal of the vehicle is not turned on.

4. The traffic safety control method according to claim wherein the method further comprises:

obtaining a latest lane position of the vehicle when the distance of the vehicle from the intersection is less than the second preset distance;

transmitting a warning when the predicted driving direction is the left turn, and the latest lane position is a middle lane or an outermost lane; and transmitting the warning when the predicted driving direction is the right turn, and the latest lane position is a middle lane or an innermost lane.

5. A vehicle-mounted device comprising:
a storage device;
at least one processor; and
the storage device storing one or more programs, which when executed by the at least one processor, cause the at least one processor to:
 determine whether there is an intersection in front of a vehicle, comprising: capturing an image using a camera that is installed on the vehicle; identifying whether the captured image comprises an image of a traffic light using an image recognition algorithm; and determining there is the intersection in front of the vehicle when the captured image comprises the traffic light;
 predict a driving direction of the vehicle at the intersection according to a driving path formed by a plurality of lane positions of the vehicle that are continuously obtained, when there is the intersection in front of the vehicle, wherein the plurality of lane positions is obtained by: beginning from the vehicle being at a first preset distance from the intersection, identifying a lane position of the vehicle each time when the vehicle travels for a second preset distance, until the vehicle is at a distance from the intersection less than the second preset distance; and
 transmit a message when the predicted driving direction is in conflict with a traffic rule of the intersection.

6. The vehicle-mounted device according to claim 5, wherein the at least one processor is further caused to:
 predict that the vehicle is going to make a left turn at the intersection, in response that the driving path formed by the plurality of lane positions is offset to a left;
 predict that the vehicle is going to make a right turn at the intersection, in response that the driving path formed by the plurality of lane positions is offset to a right; and
 predict that the vehicle is going to go straight on at the intersection, in response that the driving path formed by the plurality of lane positions is not offset to the left and right.

7. The vehicle-mounted device according to claim 5, wherein the at least one processor is further caused to:
 obtain an indication signal of a direction indicator of the vehicle when the distance of the vehicle from the intersection is less than the second preset distance;
 determine whether or not a left turn signal of the vehicle is turned on according to the indication signal when the predicted driving direction is the left turn; and transmit a warning when the left turn signal of the vehicle is not turned on; and
 determine whether or not a right turn signal of the vehicle is turned on according to the indication signal when the predicted driving direction is the right turn; and transmit the warning when the right turn signal of the vehicle is not turned on.

8. The vehicle-mounted device according to claim 5, wherein the at least one processor is further caused to:
 obtain a latest lane position of the vehicle when the distance of the vehicle from the intersection is less than the second preset distance;
 transmit a warning when the predicted driving direction the left turn, and the latest lane position is a middle lane or an outermost lane; and
 transmit the warning when the predicted driving direction the right turn, and the latest lane position is a middle lane or an innermost lane.

9. A traffic safety control method applied to a vehicle-mounted device, the method comprising:
 determining whether there is an intersection in front of a vehicle, comprising: capturing an image using a camera that is installed on the vehicle; identifying whether the captured image comprises an image of a traffic light using an image recognition algorithm; and determining there is the intersection in front of the vehicle when the captured image comprises the traffic light;
 predicting a driving direction of the vehicle at the intersection according to a driving path formed by a plurality of lane positions of the vehicle that are continuously obtained and a turning signal of the vehicle, when there is the intersection in front of the vehicle, wherein the plurality of lane positions is obtained by: beginning from the vehicle being at a first preset distance from the intersection, identifying a lane position of the vehicle each time when the vehicle travels for a second preset distance, until the vehicle is at a distance from the intersection less than the second preset distance; and
 transmitting a message when the predicted driving direction is in conflict with a traffic rule of the intersection.

10. The traffic safety control method according to claim 9, further comprising:
 predicting that the vehicle is going to make a left turn at the intersection, in response that the driving path formed by the plurality of lane positions is offset to a left;
 predicting that the vehicle is going to make a right turn at the intersection, in response that the driving path formed by the plurality of lane positions is offset to a right; and
 predicting that the vehicle is going to go straight on at the intersection, in response that the driving path formed by the plurality of lane positions is not offset to the left and right.

11. The traffic safety control method according to claim 9, wherein the method further comprises:
 obtaining an indication signal of a direction indicator of the vehicle when the distance of the vehicle from the intersection is less than the second preset distance;
 determining whether or not a left turn signal of the vehicle is turned on according to the indication signal when the predicted driving direction is the left turn; and transmitting a warning when the left turn signal of the vehicle is not turned on; and
 determining whether or not a right turn signal of the vehicle is turned on according to the indication signal when the predicted driving direction is the right turn; and
 transmitting the warning when the right turn signal of the vehicle is not turned on.

12. The traffic safety control method according to claim 9, wherein the method further comprises:
 obtaining a latest lane position of the vehicle when the distance of the vehicle from the intersection is less than the second preset distance;
 transmitting a warning when the predicted driving direction is the left turn, and the latest lane position is a middle lane or an outermost lane; and
 transmitting the warning when the predicted driving direction is the right turn, and the latest lane position is a middle lane or an innermost lane.

* * * * *